United States Patent
Desclos et al.

(10) Patent No.: US 9,479,242 B2
(45) Date of Patent: Oct. 25, 2016

(54) MODAL ANTENNA BASED COMMUNICATION NETWORK AND METHODS FOR OPTIMIZATION THEREOF

(71) Applicant: Ethertronics, Inc., San Diego, CA (US)

(72) Inventors: Laurent Desclos, San Diego, CA (US); Jeffrey Shamblin, San Marcos, CA (US)

(73) Assignee: ETHERTRONICS, INC., San Diego, CA (US)

( * ) Notice: Subject to any disclaimer, the term of this patent is extended or adjusted under 35 U.S.C. 154(b) by 0 days.

(21) Appl. No.: 14/662,176

(22) Filed: Mar. 18, 2015

(65) Prior Publication Data

US 2015/0311969 A1 Oct. 29, 2015

Related U.S. Application Data

(60) Provisional application No. 61/955,163, filed on Mar. 18, 2014.

(51) Int. Cl.

| | |
|---|---|
| *H04B 1/00* | (2006.01) |
| *H04B 15/00* | (2006.01) |
| *H04B 7/08* | (2006.01) |
| *H04W 40/12* | (2009.01) |
| *H01Q 1/24* | (2006.01) |
| *H01Q 3/44* | (2006.01) |
| *H01Q 9/42* | (2006.01) |
| *H04B 7/155* | (2006.01) |
| *H04W 72/04* | (2009.01) |

(52) U.S. Cl.
CPC ............ *H04B 7/082* (2013.01); *H01Q 1/243* (2013.01); *H01Q 3/44* (2013.01); *H01Q 9/42* (2013.01); *H04B 7/1555* (2013.01); *H04W 40/12* (2013.01); *H04W 72/046* (2013.01)

(58) Field of Classification Search
CPC ............................ H04B 7/082; H04B 7/1555
USPC ................................................ 455/63.1, 63.4
See application file for complete search history.

(56) References Cited

U.S. PATENT DOCUMENTS

| 7,911,402 | B2 | 3/2011 | Rowson et al. |
|---|---|---|---|
| 8,648,756 | B1 | 2/2014 | Desclos et al. |
| 2001/0031648 | A1 | 10/2001 | Proctor, Jr. |
| 2005/0164664 | A1* | 7/2005 | DiFonzo ................ H04L 45/00 455/277.1 |

(Continued)

FOREIGN PATENT DOCUMENTS

WO    WO2007000656    1/2007

*Primary Examiner* — Ayodeji Ayotunde
(74) *Attorney, Agent, or Firm* — Coastal Patent Law Group, P.C.

(57) ABSTRACT

A communication network is optimized using modal antenna techniques, wherein a plurality of communication nodes are synchronized with each other along with mobile and fixed wireless communication devices which comprise the user base. With one or more of the communication nodes and wireless communication devices including at least one respective modal antenna, the network is adapted for dynamic optimization of communication links amongst the wireless users. Node to user throughput, node to node throughput, as well as interference characteristics among the nodes and wireless users are each optimized as a network system to increase communication system network capacity and reliability. The multiple radiation patterns provided by the modal antennas provide a parametric for network-level synchronization to improve communication system performance.

20 Claims, 10 Drawing Sheets

(56) References Cited

U.S. PATENT DOCUMENTS

| | | | |
|---|---|---|---|
| 2005/0200524 A1* | 9/2005 | Grandhi | H01Q 1/242 342/374 |
| 2006/0164969 A1* | 7/2006 | Malik | H04B 7/0408 370/203 |
| 2013/0109327 A1 | 5/2013 | Matsumori et al. | |

* cited by examiner

| | RSSI, CQI, or other metric | | | | | |
|---|---|---|---|---|---|---|
| | AP1 | AP2 | APn | Device 1 | Device 2 | Device n |
| Mode 1 | . . . | . . . | . . . | . . . | . . . | . . . |
| Mode 2 | . . . | . . . | . . . | . . . | . . . | . . . |
| . . . . | . . . | . . . | . . . | . . . | . . . | . . . |
| Mode N | . . . | . . . | . . . | . . . | . . . | . . . |

| | RSSI, CQI, or other metric | | | | | | |
|---|---|---|---|---|---|---|---|
| | AP1 | AP2 | APn | Device 1 | Device 2 | Device n | |
| | RSSI, CQI, or other metric | | | | | | |
| | AP1 | AP2 | APn | Device 1 | Device 2 | Device n | |
| | RSSI, CQI, or other metric | | | | | | |
| | AP1 | AP2 | APn | Device 1 | Device 2 | Device n | |
| Mode 1 | ... | ... | ... | ... | ... | ... | |
| Mode 2 | ... | ... | ... | ... | ... | ... | |
| .... | ... | ... | ... | ... | ... | ... | |
| Mode N | ... | ... | ... | ... | ... | ... | |

Signal bandwidth in frequency domain of signal sent across link $L_1$

Time domain response of Link $L_1$ for passive antenna with single radiation mode Time domain response of Link L1 for Modal antenna with four radiation modes

MODAL ANTENNA BASED COMMUNICATION NETWORK AND METHODS FOR OPTIMIZATION THEREOF

CROSS-REFERENCE TO RELATED APPLICATIONS

This application claims benefit of priority with U.S. Provisional Ser. No. 61/955,163, filed Mar. 18, 2014, titled "MODAL ANTENNA BASED COMMUNICATION SYSTEM"; the contents of which are hereby incorporated by reference.

BACKGROUND

1. Field of the Invention

This invention relates generally to the field of wireless communication; and more particularly, to communication networks and improvements afforded to these networks when beam steering techniques via modal antenna systems are used on both communication nodes and wireless subscribers to increase system capacity and mitigate interference therebetween.

2. Description of the Related Art

In the field of wireless communications, a recent technological advancement includes the advent of multi-mode active antennas, or "modal antennas". A modal antenna is a single port antenna capable of being actively reconfigured between a plurality of antenna modes, wherein the modal antenna is characterized with a distinct radiation pattern in each of the plurality of antenna modes. By using the modal antenna capable of generating different radiation patterns, it is possible to exploit a priori knowledge of antenna nulls and lobes in the different modes for steering the beam to have nulls in dominant interference directions while keeping gain in desired directions. Examples of structures and implementations of the modal antennas are provided in U.S. Pat. No. 7,911,402, entitled "ANTENNA AND METHOD FOR STEERING ANTENNA BEAM DIRECTION," issued on Mar. 22, 2011; the contents of the which are hereby incorporated by reference and are summarized as follows:

FIG. 1 illustrates an example of a modal antenna 100, which includes an Isolated Magnetic Dipole™ (IMD) element 104 placed on a ground plane 108, a first parasitic element 112 coupled to an first active element 113, and a second parasitic element 116 coupled to a second active element 117. The active elements 113 and 117 may include switches that either electrically connect (short) or disconnect (open) the parasitic elements 112 and 116 to the ground plane 108. This structure allows for two different modes of operation with a common frequency corresponding to a first state where the parasitic elements 112 and 116 are shorted to the ground and a second state where the parasitic elements 112 and 116 are open.

FIG. 2(a) illustrates a radiation pattern 204 associated with the antenna 100 in the first state; and FIG. 2(b) illustrates a radiation pattern 208 in the second state, which shows a ninety-degree shift in direction as compared to the radiation pattern 204. Thus, by controlling the active elements 113 and 117 of the modal antenna 100, the operation of two modes can be obtained at the same frequency. The control scheme can be extended for three or more multi-mode operations by incorporating, for example, tunable elements in the active elements for variable control and additional active elements for matching. Further, while a parasitic element coupled to a switch will exhibit two tuning states as the switch is (i) shorted or (ii) opened, another parasitic element being coupled to a variable control active element, such as a tunable capacitor or similar tunable element, will be capable of three or more discrete tuning states, and the resulting antenna will be capable of tuning across a plurality of corresponding antenna modes. Examples of these active elements include switches, tunable capacitors, tunable phase shifters, diodes, micro-electromechanical system (MEMS) switches, MEMS tunable capacitors, and transistors including a metal oxide semiconductor field effect transistor (MOSFET), a metal semiconductor field effect transistor (MESFET), a pseudomorphic high electron mobility transistor (pHEMT), a heterojunction bipolar transistor (HBT) or of other suitable technologies.

Although certain examples are provided above, it shall be recognized that the term "modal antenna" is intended to include any single-port antenna system configured to produce a plurality of distinct radiation patterns with each radiation pattern thereof corresponding to a unique mode of a plurality of possible antenna modes. Note that the modal antenna will be characterized with a first antenna radiation pattern when in the first mode, and will be further characterized with a second and distinct antenna radiation pattern when in the second mode. Also note that the modal antenna will produce only a single mode and corresponding radiation pattern at any given time, but that the modal antenna can vary the antenna mode in time to vary the antenna's radiation pattern.

For purposes herein, the term "antenna radiation pattern" is defined as: the variation of the power radiated by the antenna as a function of the direction away from the antenna.

Now, with the above understanding of the modal antenna, we describe the state of the art of communication networks.

For purposes herein, a "communication network" includes: one or more sub-networks of communication nodes, and wireless communication devices configured to communicate with the communication nodes. A communication system may include a subpopulation of communication nodes and wireless devices within a single room, a building, a city block, or other space.

The term "sub-network" is defined as: a group of interconnected communication nodes and wireless communication devices.

The term "communication node" is defined as a central connecting point through which one or more wireless communication devices communicate to form a network. A communication node may include, for example, a WiFi access point (AP) or cellular base station transceiver (BST), including a miniature cellular base station transceiver (mBST) also referred to as a "small cell site" or "personal base station".

The term "wireless communication device", is defined as any device configured to communicate with one or more other devices through a wireless network connection. A wireless communication device may include a "mobile device", such as, for example, a cell phone, tablet, or lap top computer, which is portable. Another example of wireless communication devices includes a wireless computer tower, which is non-portable or "fixed". The terms "mobile user device" and "mobile device" are a subset of the group of wireless communication devices including those devices which are mobile or portable.

Cellular networks and wireless local area networks (WLANs) are now prevalent in society and have evolved to a level that moderate to high data rate transmissions along with voice communications are stable and reliable over large regions and throughout urban areas. Mobile user devices have progressed to the point of providing not only voice communications and low data rate text and email service, but also high data rate internet connectivity. Continued adoption of mobile devices, and introduction of new uses of cellular networks, such as machine to machine (M2M) applications, have put a strain on the cellular systems in regard to providing consistent service and improved service in terms of higher data rates and less service interruptions from one year to the next. Similar congestion can be found on WLAN networks were large number of users are putting strain on the systems. Continued improvements are sought after to improve communication system reliability as well as better command and control of communication nodes and the mobile devices utilizing these nodes.

SUMMARY OF THE INVENTION

It is therefore one aspect of the invention to provide an improved communication system, with improved management of the communication nodes that make up the communication system, and increased flexibility of synchronizing multiple mobile device users of these networks.

In the instant disclosure, a communication network is optimized using modal antenna techniques, wherein a plurality of communication nodes are synchronized with each other along with mobile and fixed wireless communication devices which comprise the user base. With one or more of the communication nodes and wireless communication devices including at least one respective modal antenna, the network is adapted for dynamic optimization of communication links amongst the wireless users. Node to user throughput, node to node throughput, as well as interference characteristics among the nodes and wireless users are each optimized as a network system to increase communication system network capacity and reliability. The multiple radiation patterns provided by the modal antennas provide a parametric for network-level synchronization to improve communication system performance.

DESCRIPTION OF EMBODIMENTS

Figure 1:
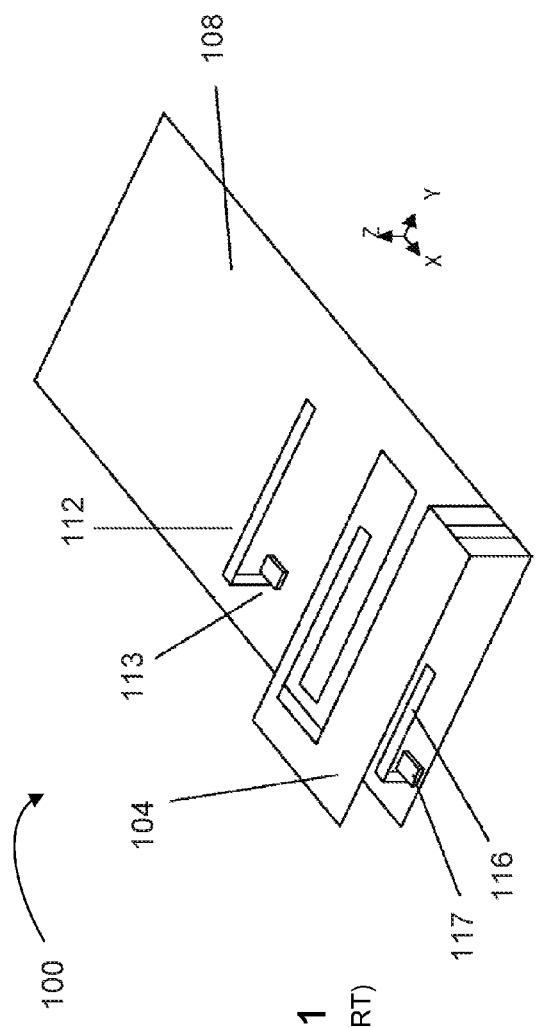
FIG. 1 shows an example of a modal antenna.
Figure 2B:
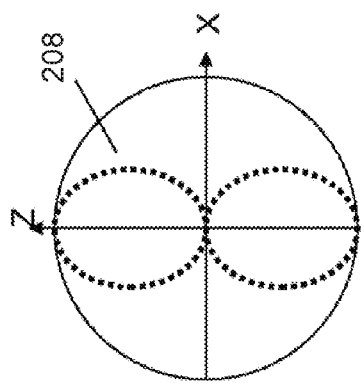
FIG. 2(b) illustrates a radiation pattern associated with the antenna of FIG. 1 when in the second state, which shows a ninety-degree shift in direction as compared to the radiation pattern of the first state.
Figure 2A:
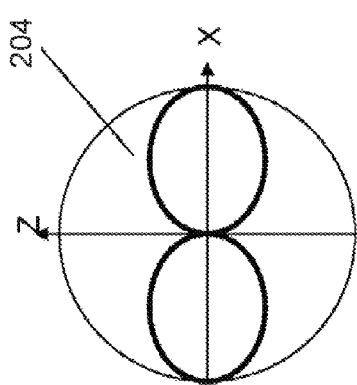
FIG. 2(a) illustrates a radiation pattern associated with the antenna of FIG. 1 in the first state.

In the following description, for purposes of explanation and not limitation, details and descriptions are set forth in order to provide a thorough understanding of the present invention in accordance with an illustrated embodiment. However, it will be apparent to those skilled in the art that the present invention may be practiced in other embodiments that depart from these details and descriptions without departing from the spirit and scope of the invention. An illustrated embodiment will be described below with reference to the drawings wherein illustrative features are denoted by reference numerals.

Herein described is a communication network where beam steering antenna techniques are implemented in the form of modal antenna techniques at both the communication nodes and the mobile and fixed devices. A modal antenna is generally a single port antenna system capable of generating multiple radiation modes, wherein the radiation modes are de-correlated when compared to each other. The propagation link characteristics are measured for each mobile and fixed device on the communication network, with the link characteristics per radiation mode for each device transmitted to one or several nodes in the network. The network determines the optimal radiation modes for each mobile and fixed device on the network to provide optimal data transfer between mobile and fixed devices and the nodes as well as data transfer between mobile and fixed devices with other mobile and fixed devices. Interference characteristics for devices on the network are taken into consideration and accounted for during the radiation mode selection process for the mobile and fixed devices.

One embodiment includes a modal communication network comprised of a plurality of communication nodes, with a plurality of the nodes possessing modal antennas capable of generating multiple radiation modes. A plurality of mobile and fixed communication devices using this modal communication network are further configured with modal antennas capable of generating multiple radiation modes. Each node surveys communication devices in the vicinity, or within range, and determines the radiation mode for the modal antenna at the node and the modal antenna at the communication device for optimal communication link performance therebetween. Each communication device using the modal communication network that possesses a modal antenna conducts a survey of nodes and communication devices comprising and using the modal communication network. Communication link quality between communication devices and nodes and interfering signals from one communication device to other communication devices is noted and logged, and this information is transmitted as signal data from each communication device to one or multiple nodes. A modal communication control unit contains a processor with algorithm which collects and analyzes information on link quality related to radiation modes of modal antennas at the nodes and communication devices using the network. The algorithm makes decisions based on system metrics such as capacity, throughput, received signal strength indicator (RSSI), channel quality indicator (CQI), and other parameters to provide optimal system performance. Modal antenna mode selection is made by the algorithm and this information is transmitted to the nodes on the network as well as the communication devices. Each node and device then configures the respective modal antennas in a preferred mode (also called an "operating mode").

In another embodiment, one node is selected as a master node that interfaces with the modal communication control unit. The master node is used to send modal antenna mode selection to the other nodes in the communication system as well as the communication devices on the network.

In another embodiment, a fixed location communication device is connected to the modal communication system and the radiation modes of the integrated modal antenna system in the fixed location device are tested to determine the optimum mode to use when communicating with a node. The use of multiple radiation modes in the fixed location device provides the capability of choosing the best mode for the propagation environment in the vicinity of the fixed location device and the nodes that it can communicate with. The best radiation mode is selected and used for communication per node. Periodic sampling of the other modes is performed to verify that the best mode is used. The periodic sampling of the other available modes provides the capability of compensating the antenna system characteristics for changes in the propagation channel.

In another embodiment, a modal communication network can interface with another communication network such as a cellular network operating at 3G or 4G protocol. The modal communication network can be a dedicated in-building link where multiple communication devices and nodes are dispersed within the building. This dedicated in-building link can be operating on the WLAN protocol or can be operating on a private secure communication system. One or multiple nodes can operate at the frequency band and protocol that the cellular network operates at, and can provide a communication link between the cellular network and the modal communication network. The nodes that are assigned to communicate with the cellular network contain modal antennas that are dual or multi-frequency such that the node can communicate with the cellular system and relay data to communication devices on the modal communication network. A modal antenna can select the radiation mode that best interfaces with the cellular network, and then communicates to in-building devices on the modal communication network by selecting the modal communication network radiation mode that best interfaces with the in-building device. This type of communication network can provide improved transmission performance for in-building applications.

In another embodiment, a communication network comprises: one or multiple communication nodes, where a node is comprised of a communication circuit capable of transmitting and receiving data; one or multiple communication devices, wherein a communication device comprising a communication circuit capable of transmitting or receiving data; and a communication control unit; wherein one or more of the nodes comprise a modal antenna, wherein the modal antenna is capable of generating a plurality of radiation modes each having a distinct radiation pattern at each mode. The communication control unit contains an algorithm which implements a radiation mode selection process to optimize the communication link between nodes and communication devices by selecting radiation modes for the nodes with modal antennas.

The communication system may include one of the nodes containing a modal antenna being assigned a master control status (termed master node), wherein the master node is responsible for control of the other nodes and communication devices. The master node will monitor the communication link performance between node to node, communication device to node, and/or communication device to communication device.

In certain embodiments, the master node establishes a connection with a second communication network, with this second communication network operating at a different frequency, modulation scheme, and/or protocol compared to the first communication network. The master node receives and transmits data from the second communication network and sends the data to, or receives data from, nodes and/or communication devices that are associated with the first communication network.

In another embodiment, the master node receives data from a node associated with the second communication network and transmits this data using the first communication network to a communication device or node associated with the first communication network. The node or communication device that receives the data from the master node transmits the data using the first communication network to another node or communication device on the first communication network.

In another embodiment, the master node contains a first modal antenna associated with the first communication network and a second modal antenna associated with the second communication network.

In another embodiment, one or multiple communication devices each contain a modal antenna, wherein a modal antenna system is capable of generating a plurality of radiation modes. The modal antenna of the communication device measures communication link performance between the communication device and one or multiple nodes for the plurality of radiation modes of the modal antenna system of the communication device. The communication link performance for the radiation modes is transmitted to one or multiple nodes, which relays the information to the communication control unit. The communication control unit contains an algorithm which implements a radiation mode selection process to optimize the communication link between nodes and communication devices by proper selection of radiation modes for the modal antennas at the communication device and the nodes.

In another embodiment, a communication network comprises: multiple communication nodes, and a communication control unit; wherein one or more of the nodes comprise a modal antenna, wherein the modal antenna is capable of generating a plurality of radiation modes each having a distinct radiation pattern at each mode. The communication control unit contains an algorithm which implements a radiation mode selection process to optimize the communication link between nodes and communication devices by selecting radiation modes for the nodes with modal antennas.

Figures 3, 4:
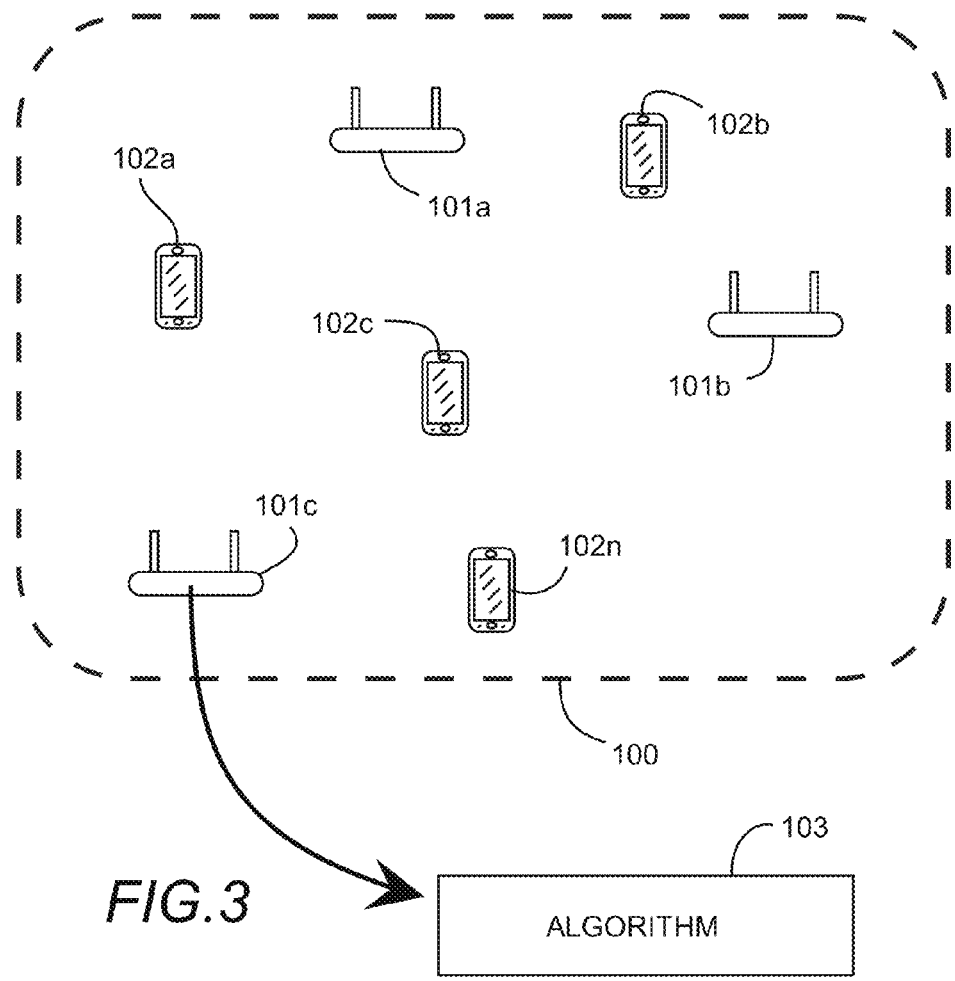
FIG. 3 illustrates a communication network having three nodes and four communication devices; at least one of the nodes includes a modal antenna and algorithm which is used to optimize communication links with the multiple communication devices.
FIG. 4 shows an example of a signal data matrix (matrix of data) wherein signal level data is populated for various nodes and devices among a plurality of modes of the modal antenna.

Now turning to the drawings:

FIG. 3 illustrates a communication network 100 having three access points or nodes 101a; 101b; 101c and four communication devices 102a; 102b; 102c; 102n. One or more of the nodes each contain a modal antenna which is used to establish communication links with the multiple communication devices. Communication link quality data is measured and stored for modal antennas in both the nodes and communication devices. An algorithm 103 hosted in one of the nodes is used to compare signal level achieved between nodes and devices for determining a potential link quality improvement. If an improvement is obtainable, the algorithm will select the preferred mode prior to communicating instructions to the devices and nodes containing modal antennas for configuring the modal antennas in their preferred mode for optimizing link performance and minimizing interferers within the communication network.

FIG. 4 shows an example of a signal data matrix (matrix of data) wherein signal level data is populated for various nodes and devices among a plurality of modes of the modal antenna. Here, the nodes are labeled as AP1 to APn, and the devices are labeled as Device 1 to Device n.

Figure 5:
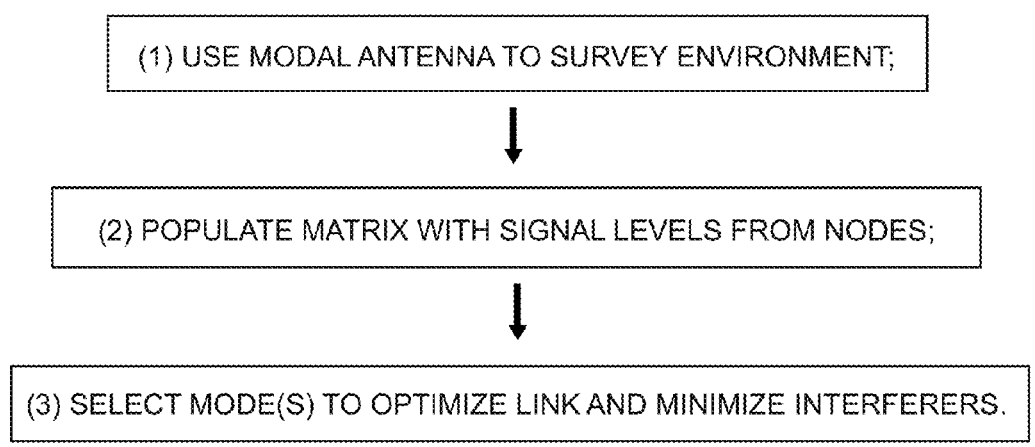
FIG. 5 shows a method for optimizing link quality and reducing interferers among devices and nodes within a modal antenna communication network.

FIG. 5 shows a method for optimizing link quality and reducing interferers among devices and nodes within a modal antenna communication network.

Figures 6, 7:
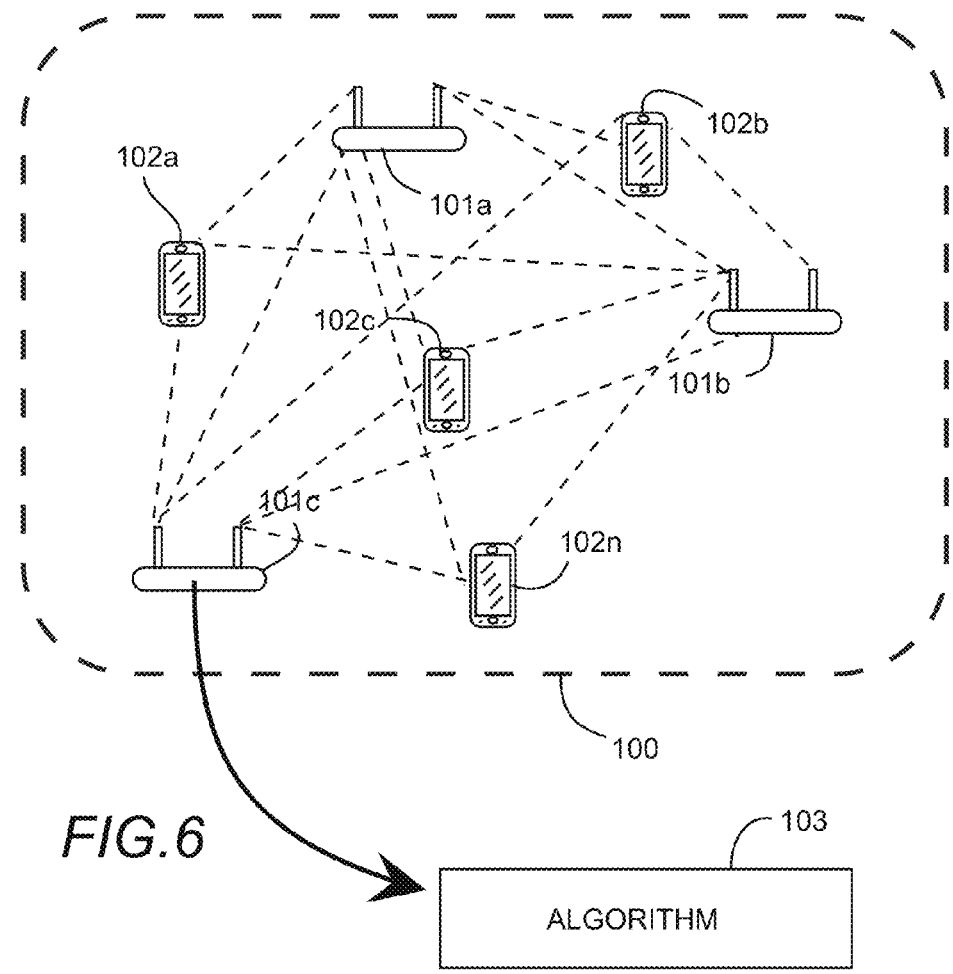
FIG. 6 illustrates a communication network having three communication nodes and four wireless communication devices; multiple of the nodes and devices each contain a modal antenna.
FIG. 7 shows multiple signal data matrices with data propagated from multiple nodes and devices.

FIG. 6 illustrates a communication network 100 having three nodes 101a; 101b; 101c and four communication devices 102a; 102b; 102c; 102n. The nodes contain modal antennas which are used to establish communication links with the multiple communication devices. Communication link quality data is measured and stored for modal antennas for links between communication device to communication device, as well as communication device to node, and node to node. This data is used to populate a signal data matrix, and a plurality of data matrices can be combined for the various nodes and devices as shown in FIG. 7.

Figure 8:
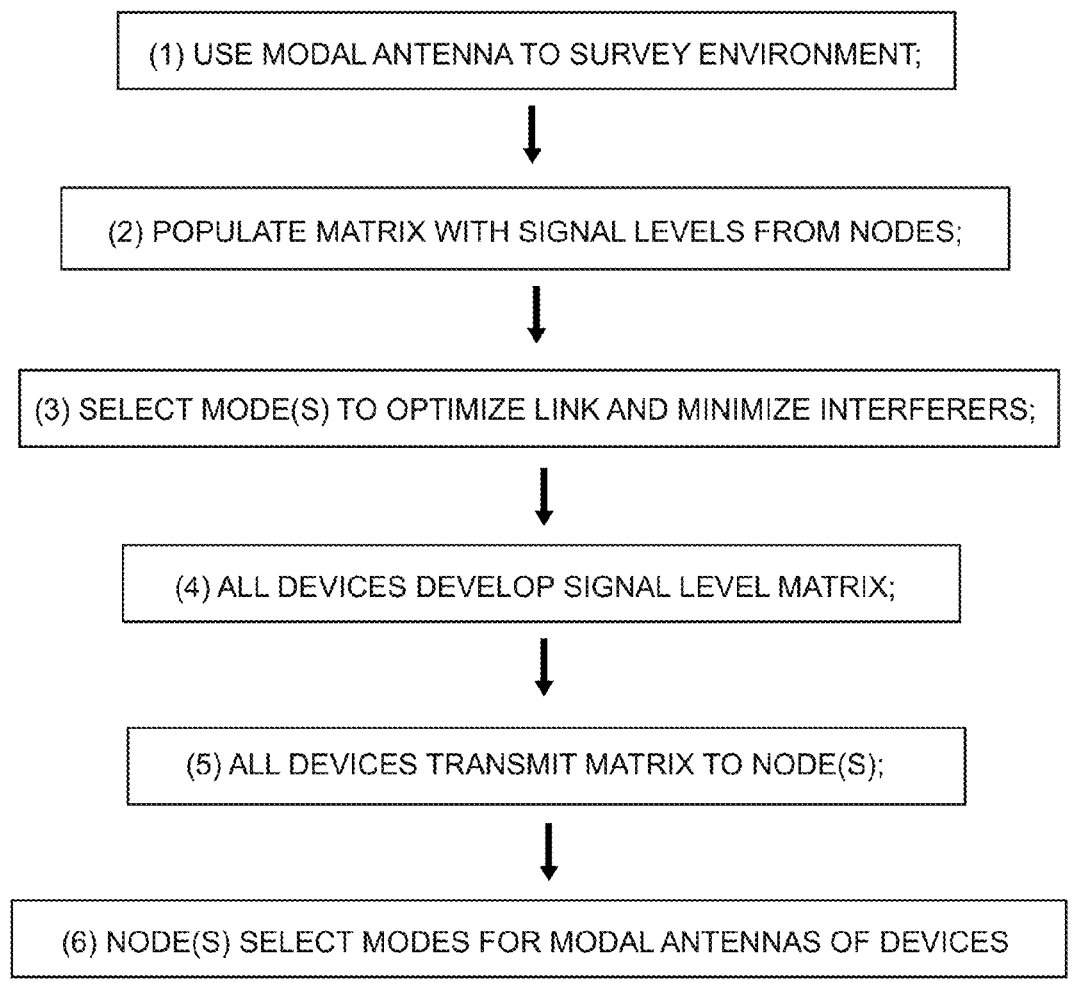
FIG. 8 shows another method for optimizing link quality and reducing interferers among devices and nodes within a modal antenna communication network.

FIG. 8 shows another method for optimizing link quality and reducing interferers among devices and nodes within a modal antenna communication network.

Figure 9A:
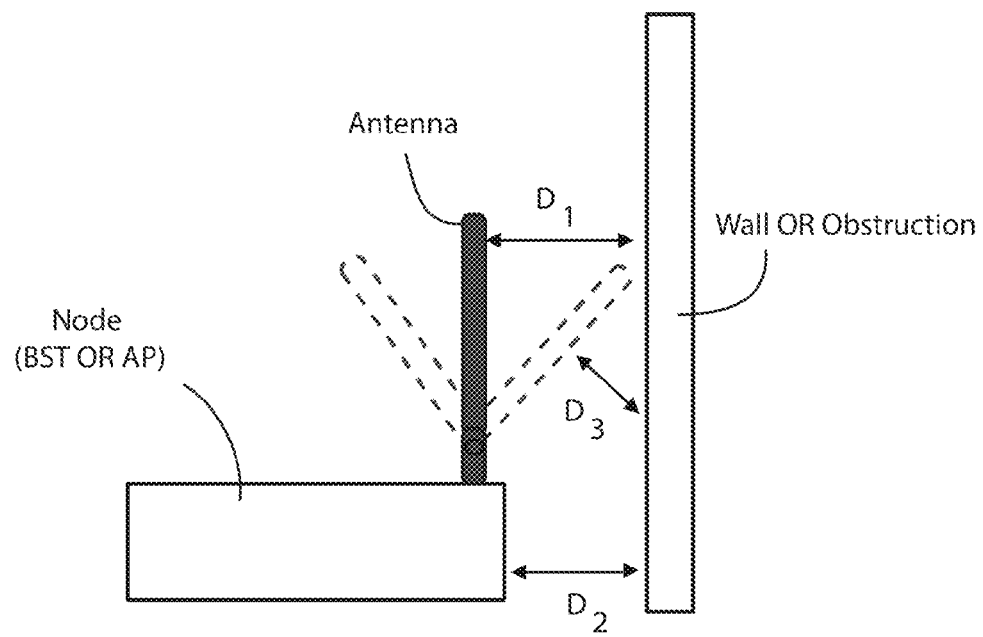
FIG. 9A illustrates a communication node which is positioned close to a wall or obstruction; an external antenna is used to transmit and/or receive for the access point or base terminal; the antenna position in relation to the obstruction or wall will affect the performance of the antenna.

FIG. 9A illustrates a communication node such as an access point or base terminal which is positioned close to a wall or obstruction. An external antenna is used to transmit and/or receive for the access point or base terminal. Distances between antenna and the wall or obstruction ($D_1$); the node and the wall or obstruction ($D_2$); the bent external antenna ($D_3$) are each shown. The antenna position in relation to the obstruction or wall will affect the performance of the antenna.

Figure 9B:
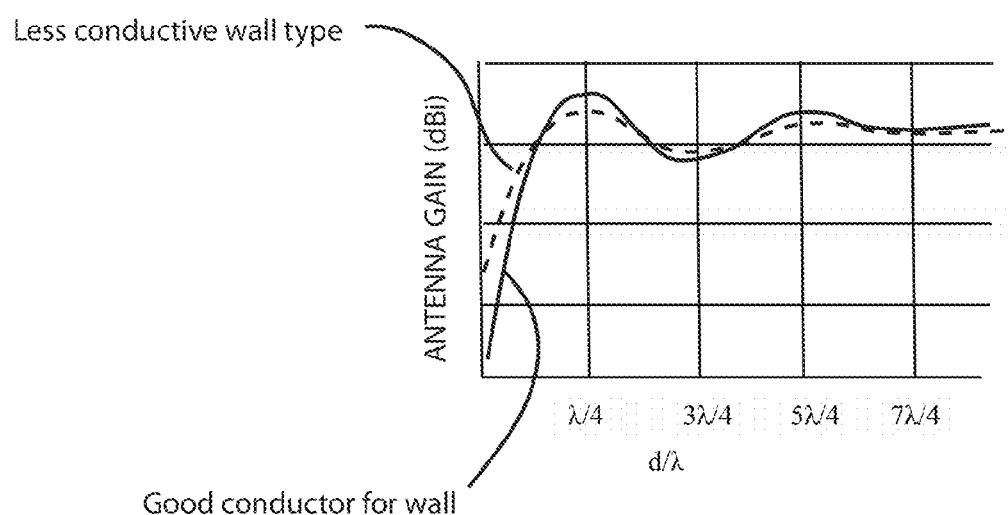
FIG. 9B is a plot of antenna gain as a function of antenna position from obstruction with respect to the communication node of FIG. 9A.

FIG. 9B shows a plot of antenna gain as a function of antenna position from obstruction.

Figure 10:
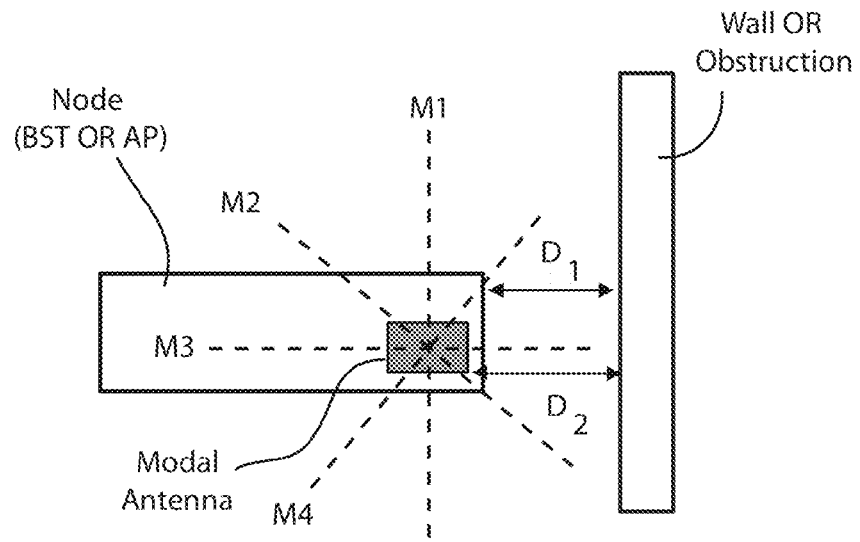
FIG. 10 illustrates a communication which contains a modal antenna capable of generating multiple radiation patterns; the four radiation patterns (modes) are shown.

FIG. 10 illustrates a communication node which contains a modal antenna. The modal antenna is a single port antenna capable of generating a distinct radiation patterns for each of the multiple modes of the modal antenna. Four radiation pattern modes M1; M2; M3; and M4 of the modal antenna embedded in the base terminal or access point are each shown. A modal antenna where multiple radiation modes can be generated can be integrated internal to an access point or terminal and radiation modes can be selected to optimize the corresponding radiation pattern for the environment.

Figure 11:
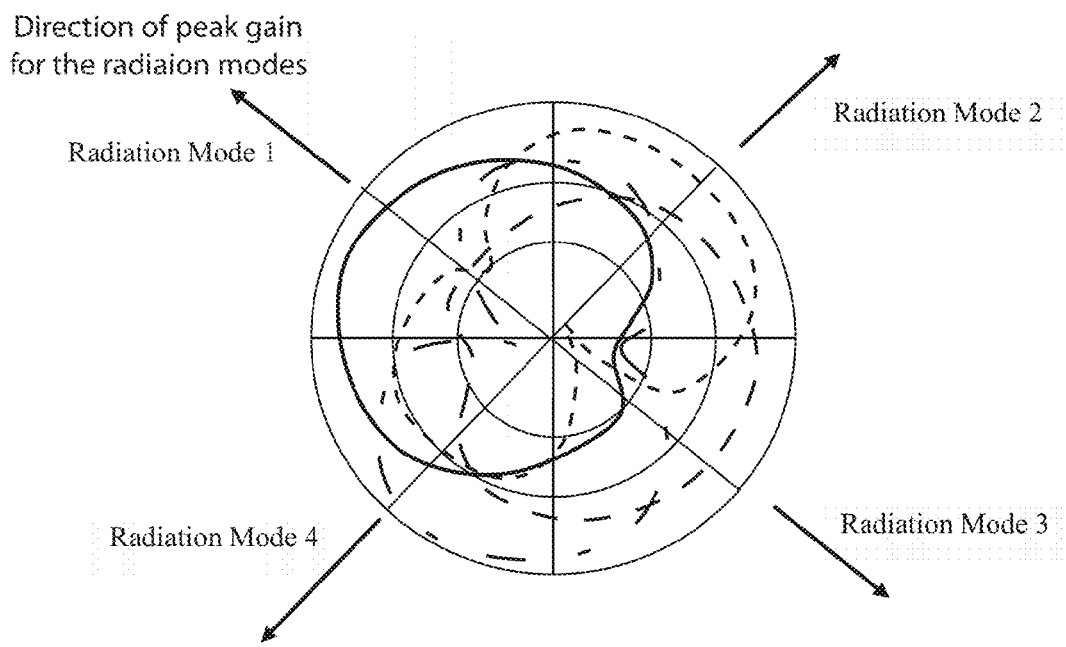
FIG. 11 shows a two dimensional plot of the corresponding antenna radiation patterns associated with the four modes of the modal antenna of FIG. 10.

FIG. 11 shows a two-dimensional plot of the radiation patterns corresponding to modes M1 thru M4 of the modal antenna of FIG. 10. Note that the gain maxima and nulls can be steered in a desired direction by configuring the antenna in one of the four illustrated modes.

Figure 12:
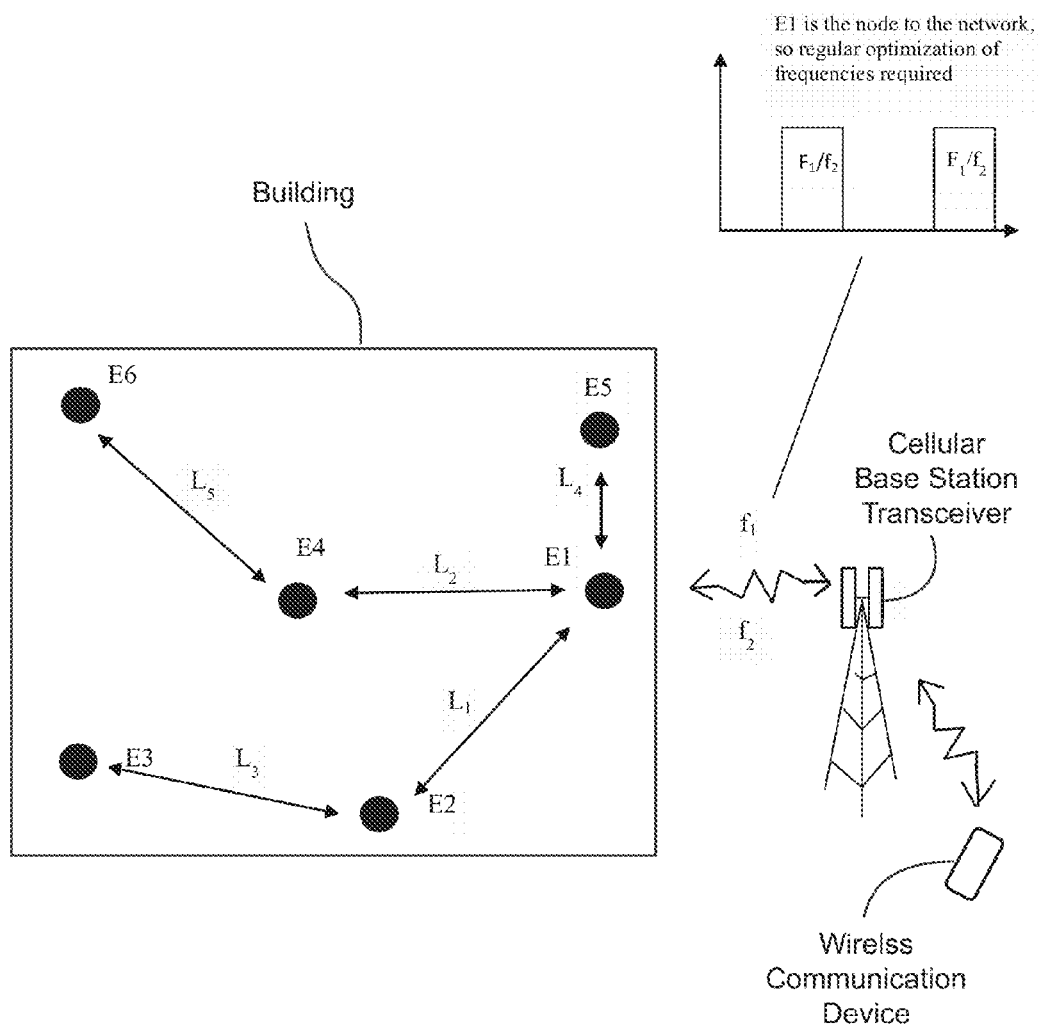
FIG. 12 illustrates a communication network operating in a building; wherein one node of the communication network connects to a base terminal external to the building and relays information to and from other nodes positioned in-building.

FIG. 12 illustrates a communication network operating in a building. The cellular network is capable of monitoring building communications in addition to communications with external devices such as the cell phone as shown. One node of the communication network connects to a cellular base station transceiver that is external to the building and relays information to and from other nodes positioned in-building. Node $E_1$ is connected to the cellular network. Because $E_1$ is the node gateway to the network, node $E_1$ is regularly synchronized with the network. $E_2$ could be implemented as a sub-node; optimizing links $L_1$ or $L_3$ depending on the request from $E_1$.

Figure 13:
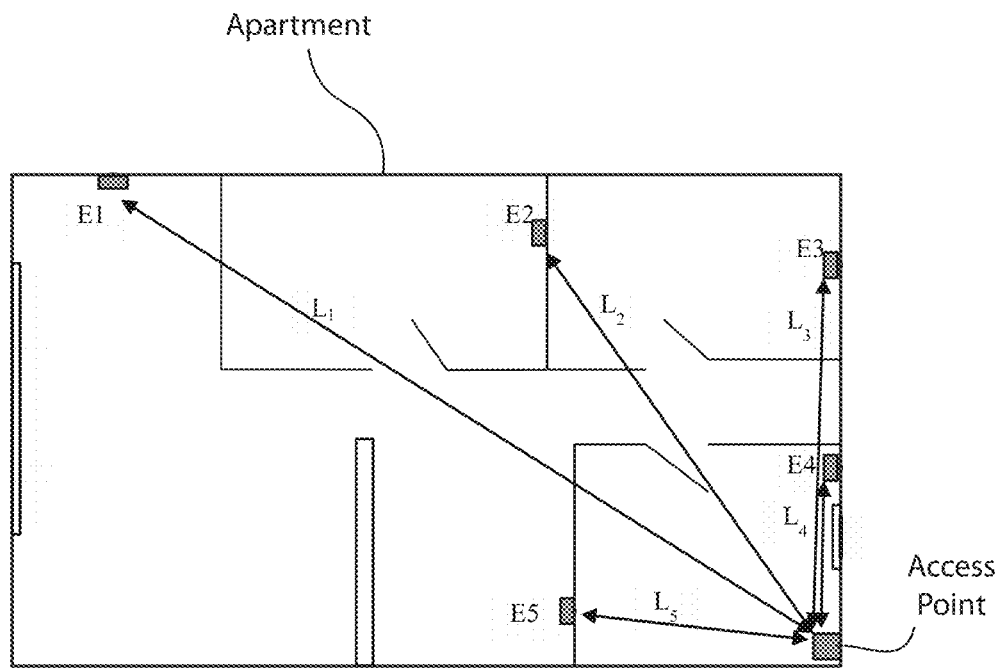
FIG. 13 illustrates a communication network operating in an apartment, wherein a communication node is installed on the floor of a building and coupled with five communication devices labeled E1 through E5.
Figure 14:
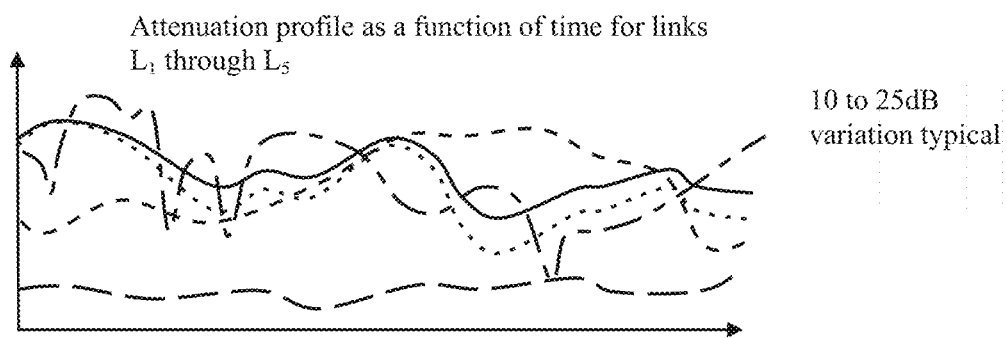
FIG. 14 shows an attenuation profile for the communication links shown in FIG. 13 as a function of time.

FIG. 13 illustrates an access point installed on the floor of a building (apartment) and coupled with five communication devices labeled E1 through E5. FIG. 14 shows an attenuation profile for the communication links as a function of time.

Figure 15A:
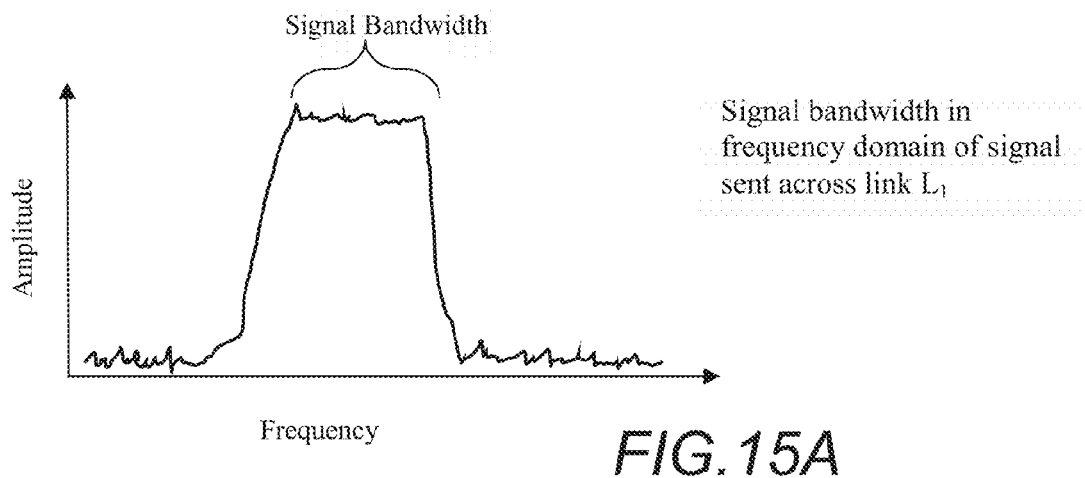
FIG. 15A illustrates the frequency response of a signal used in a communication network that occupies a set bandwidth.

FIG. 15A illustrates the frequency response of a signal used in a communication network that occupies a set bandwidth.

Figure 15B:
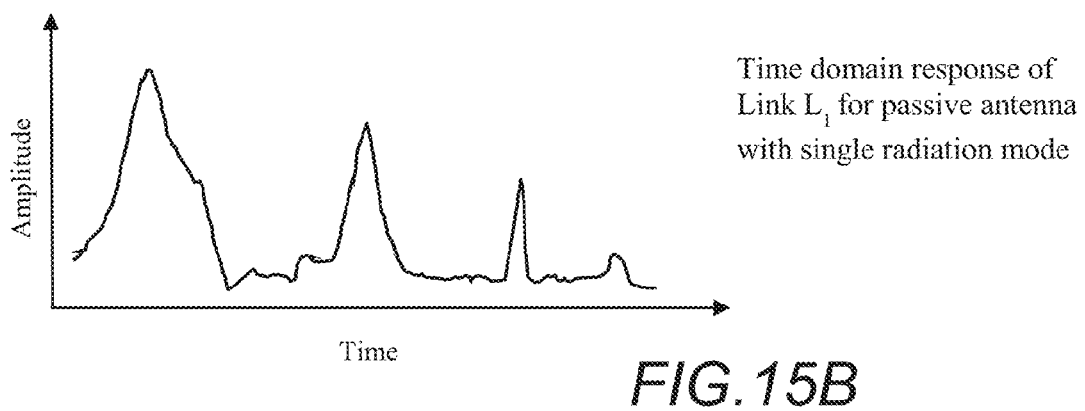
FIG. 15B shows the time domain response of this frequency domain signal of FIG. 15A.

FIG. 15B shows the time domain response of this frequency domain signal of FIG. 15A.

Figure 15C:
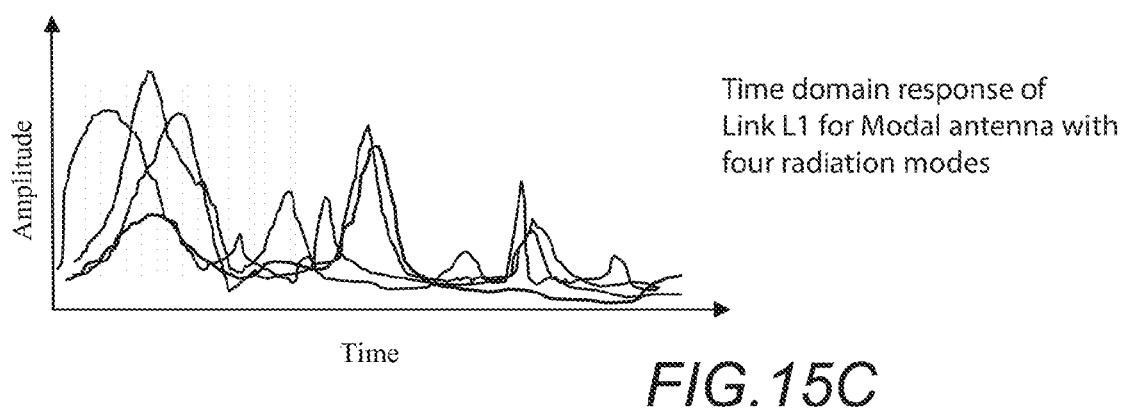
FIG. 15C shows a time domain plot of the propagation channel characteristics for four radiation modes.

FIG. 15C shows a time domain plot of the propagation channel characteristics for four radiation modes.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. In a communication network having one or more wireless communication devices coupled to one or more communication nodes, at least one of the communication nodes including a modal antenna configured to produce a distinct radiation pattern when configured in each of a plurality of possible antenna modes thereof, a method for optimizing communication link performance between one or more of the nodes and devices within the communication network, the method comprising:

with a first communication node comprising a first modal antenna, the first modal antenna in a first mode of the plurality of possible antenna modes thereof:
    using the first modal antenna in the first mode to survey an environment within range of the first communication node to determine a first signal level achieved with each other communication node and each wireless communication device within said range;
    populating a matrix of data with the first signal levels for each of the surveyed nodes and devices corresponding to the first mode of the modal antenna;
reconfiguring the first modal antenna in a second mode of the plurality of possible antenna modes thereof:
    using the first modal antenna in the second mode to survey the environment within range of the first communication node to determine a second signal level achieved with each other communication node and each wireless communication device within said range;
    further populating the matrix of data with the second signal levels for each of the surveyed nodes and devices corresponding to the second mode of the modal antenna; and
selecting a preferred mode of the first modal antenna based on the matrix of data, wherein the preferred mode provides optimal link performance and minimized interferers within the communication network.

2. The method of claim 1, wherein said first and second signal levels comprise data associated with one or more signal metrics selected from: received signal strength indicator (RSSI) or channel quality indicator (CQI).

3. The method of claim 1, wherein said first communication node comprises one of: a WiFi access point, or a cellular base station transceiver.

4. The method of claim 1, wherein each of said wireless communication devices individually comprises one of: a cell phone, tablet, or a laptop-computer.

5. The method of claim 1, wherein the first modal antenna comprises:
    an antenna element positioned above a circuit board forming an antenna volume therebetween;
    a first parasitic element positioned within the antenna volume;
    a first active tuning element coupled to the first parasitic element;
    a second parasitic element positioned adjacent to the antenna and outside of the antenna volume;
    a second active tuning element coupled to the second parasitic element;
    wherein each of said first and second active tuning elements is individually selected from:
        a switch, tunable capacitor, tunable phase shifter, diode, micro-electro-mechanical system (MEMS) switch, MEMS tunable capacitor, metal oxide semiconductor field effect transistor (MOSFET), a metal semiconductor field effect transistor (MESFET), pseudomorphic high electron mobility transistor (pHEMT), and a heterojunction bipolar transistor (HBT).

6. The method of claim 1, further comprising:
with a second communication node within the communication network, the second communication node comprising a second modal antenna:
with the second modal antenna configured in the first mode thereof:
    surveying an environment within range of the second communication node to obtain first mode data achieved with each other communication node and each wireless communication device;
    populating a second matrix of data with the first mode data for each of the surveyed nodes and devices corresponding to the first mode of the second modal antenna;
reconfiguring the second modal antenna in a second mode of the plurality of possible antenna modes thereof:
    further surveying the environment within range of the second communication node to obtain second mode data achieved with each other communication node and each wireless communication device;
    populating the second matrix of data with the second mode data for each of the surveyed nodes and devices corresponding to the second mode of the second modal antenna; and
selecting a preferred mode of the second modal antenna based on the second matrix of data, wherein the preferred mode provides optimal link performance and minimized interferers within the communication network.

7. The method of claim 1, wherein a plurality of communication nodes within the communication network each comprises a modal antenna, the method further comprising for each of said nodes:
    in a first mode of the respective modal antenna:
        surveying the other nodes and devices within the communication network to determine signal level therebetween;
        populating data associated with the signal level of each of the other nodes and devices in a respective matrix of data;
    reconfiguring the respective modal antenna in a second mode; and
    with the antenna in the second mode:
        further surveying the other nodes and devices within the communication network to determine signal level therebetween; and
        populating data associated with the signal level of each of the other nodes and devices in the respective matrix of data.

8. The method of claim 7, further comprising:
designating one of the plurality of communication nodes within the communication network as a master communication node.

9. The method of claim 8, further comprising:
for each of the plurality of communication nodes:
communicating the respective matrix of data with the master communication node.

10. The method of claim 9, further comprising:
with the master communication node, receiving the respective matrix of data from each of the plurality of communication nodes;
determining a respective preferred mode for each modal antenna associated with the plurality of communication nodes; and
communicating the preferred mode to each respective node of the plurality of communication nodes for reconfiguring the modal antenna thereof.

11. The method of claim 10, wherein the preferred mode for each modal antenna as selected by the master communication node is selected based on the respective matrix of data from each of the plurality of communication nodes, wherein the preferred mode for each antenna is the mode that provides optimum link performance and minimum interferers within the communication network.

12. The method of claim 10, further comprising: with the master communication node: combining the respective matrix of data from each of the plurality of communication nodes to form a combined matrix of data including signal level data between each respective node and device in each of the antenna modes of the modal antennas thereof.

13. The method of claim 1, wherein a plurality of wireless communication devices within the communication network each comprises a modal antenna, the method further comprising for each of said nodes:
in a first mode of the respective modal antenna:
surveying the other nodes and devices within the communication network to determine signal level therebetween;
populating data associated with the signal level of each of the nodes and other devices in a respective matrix of data;
reconfiguring the respective modal antenna in a second mode; and
with the antenna in the second mode:
further surveying the nodes and other devices within the communication network to determine signal level therebetween; and
populating data associated with the signal level of each of the other nodes and devices in the respective matrix of data.

14. The method of claim 8, further comprising:
with the master communication node:
relaying information between each of the other communication nodes of the communication network and a cellular base terminal;
wherein only the master communication node of the plurality of communication nodes is configured to communicate with the cellular base terminal; and
wherein the master communication node is configured to manage communications between the cellular base terminal and the other nodes and wireless devices in the communication network.

15. A communication network, comprising:
one or more wireless communication devices linked to one or more communication nodes;
at least a first communication node of the one or more communication nodes comprising a modal antenna, the modal antenna configured to produce a distinct radiation pattern when configured in each of a plurality of possible antenna modes thereof;
the first communication node further comprising a processor coupled to the modal antenna and configured to execute a method for selecting an operating mode of the modal antenna from the plurality of possible antenna modes thereof, the method including:
with the modal antenna in a first mode thereof:
surveying the other nodes and devices within the communication network to determine signal level therebetween;
populating data associated with the signal level of each of the other nodes and devices in a matrix of data;
reconfiguring the modal antenna in a second mode; and
with the modal antenna in the second mode:
further surveying the other nodes and devices within the communication network to determine signal level therebetween; and
populating data associated with the signal level of each of the other nodes and devices in the respective matrix of data;
selecting the operating mode of the modal antenna based on the matrix of data, wherein the operating mode provides optimal link performance and minimized interferers among the one or more wireless communication devices and the one or more communication nodes within the communication network.

16. The communication network of claim 15, each of said wireless communication devices individually comprising one of: a cell phone, tablet, and laptop-computer.

17. The communication network of claim 15, wherein said first communication node comprises one of: a WiFi access point, or a cellular base station transceiver.

18. The communication network of claim 15, wherein the modal antenna comprises:
an antenna element positioned above a circuit board forming an antenna volume therebetween;
a first parasitic element positioned within the antenna volume;
a first active tuning element coupled to the first parasitic element;
a second parasitic element positioned adjacent to the antenna and outside of the antenna volume;
a second active tuning element coupled to the second parasitic element;
wherein each of said first and second active tuning elements is individually selected from:
a switch, tunable capacitor, tunable phase shifter, diode, micro-electro-mechanical system (MEMS) switch, MEMS tunable capacitor, metal oxide semiconductor field effect transistor (MOSFET), a metal semiconductor field effect transistor (MESFET), pseudomorphic high electron mobility transistor (pHEMT), and a heterojunction bipolar transistor (HBT).

19. The communication system of claim 15, wherein a plurality of the one or more wireless communication devices linked to one or more communication nodes each comprises a respective modal antenna; and wherein each of the modal antennas is used to survey a signal level between each of the nodes and devices.

20. The communication system of claim 19, wherein said first communication node is designated a master communication node, and wherein the master communication node is configured to: receive signal level data from each of the other nodes and the devices, determine an optimal antenna mode for each of the modal antennas in the system based on the received signal level data, and communicate with the respective other nodes and devices for configuring each modal antenna thereof to operate in a preferred mode, wherein the communication system is optimized for maximum link performance and minimal interferers with each of the modal antennas configured in the respective preferred modes.

* * * * *